US011543049B2

(12) United States Patent
Greci et al.

(10) Patent No.: US 11,543,049 B2
(45) Date of Patent: *Jan. 3, 2023

(54) DENSITY-BASED FLUID FLOW CONTROL DEVICES

(71) Applicant: Halliburton Energy Services, Inc., Houston, TX (US)

(72) Inventors: Stephen Michael Greci, Little Elm, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 174 days.

This patent is subject to a terminal disclaimer.

(21) Appl. No.: 16/755,881

(22) PCT Filed: Oct. 23, 2018

(86) PCT No.: PCT/US2018/056977
§ 371 (c)(1),
(2) Date: Apr. 13, 2020

(87) PCT Pub. No.: WO2019/135814
PCT Pub. Date: Jul. 11, 2019

(65) Prior Publication Data
US 2020/0291745 A1 Sep. 17, 2020

Related U.S. Application Data

(60) Provisional application No. 62/613,948, filed on Jan. 5, 2018.

(51) Int. Cl.
*F16K 33/00* (2006.01)
*E21B 34/08* (2006.01)
(Continued)

(52) U.S. Cl.
CPC .............. *F16K 33/00* (2013.01); *E21B 34/06* (2013.01); *E21B 34/08* (2013.01); *E21B 43/12* (2013.01);
(Continued)

(58) Field of Classification Search
CPC .......... E21B 34/06; E21B 34/08; E21B 43/14; E21B 43/12; F16K 31/30; F16K 31/18; F16K 33/00
See application file for complete search history.

(56) References Cited

U.S. PATENT DOCUMENTS 7,409,999 B2 * 8/2008 Henriksen ............... E21B 43/12
166/330
9,453,395 B2 * 9/2016 Fripp ...................... E21B 43/12
(Continued)

OTHER PUBLICATIONS

International Search Report and Written Opinion for PCT application PCT/US2018/056977 dated Mar. 11, 2019, 12 pages.

*Primary Examiner* — George S Gray
(74) *Attorney, Agent, or Firm* — Scott Richardson; Parker Justiss, P.C.

(57) ABSTRACT

A fluid flow control device includes a rotatable component for rotating about an axis in response to fluid flow from an inlet port of the fluid flow control device. A float component is positioned within the rotatable component and connected to the rotatable component by a hinge. The hinge provides for movement of the float component relative to the rotatable component between (i) an open position that enables fluid flow from the inlet port to an outlet port of the rotatable component, and (ii) a closed position that restricts fluid flow through a flow passage from the inlet port to the outlet port.

28 Claims, 11 Drawing Sheets

(51) Int. Cl.
  *F16K 31/18*   (2006.01)
  *E21B 34/06*   (2006.01)
  *E21B 43/12*   (2006.01)
  *F16K 31/30*   (2006.01)
  *E21B 43/14*   (2006.01)

(52) U.S. Cl.
  CPC .............. *F16K 31/18* (2013.01); *F16K 31/30* (2013.01); *E21B 43/14* (2013.01)

(56) References Cited

U.S. PATENT DOCUMENTS

| | | |
|---|---|---|
| 2006/0076150 A1 | 4/2006 | Coronado |
| 2012/0211243 A1 | 8/2012 | Dykstra et al. |
| 2013/0092393 A1 | 4/2013 | Dykstra et al. |
| 2013/0112423 A1 | 5/2013 | Dykstra et al. |
| 2013/0220633 A1 | 8/2013 | Felten |
| 2014/0041731 A1 | 2/2014 | Fripp et al. |
| 2015/0068811 A1 | 3/2015 | Marchand et al. |

\* cited by examiner

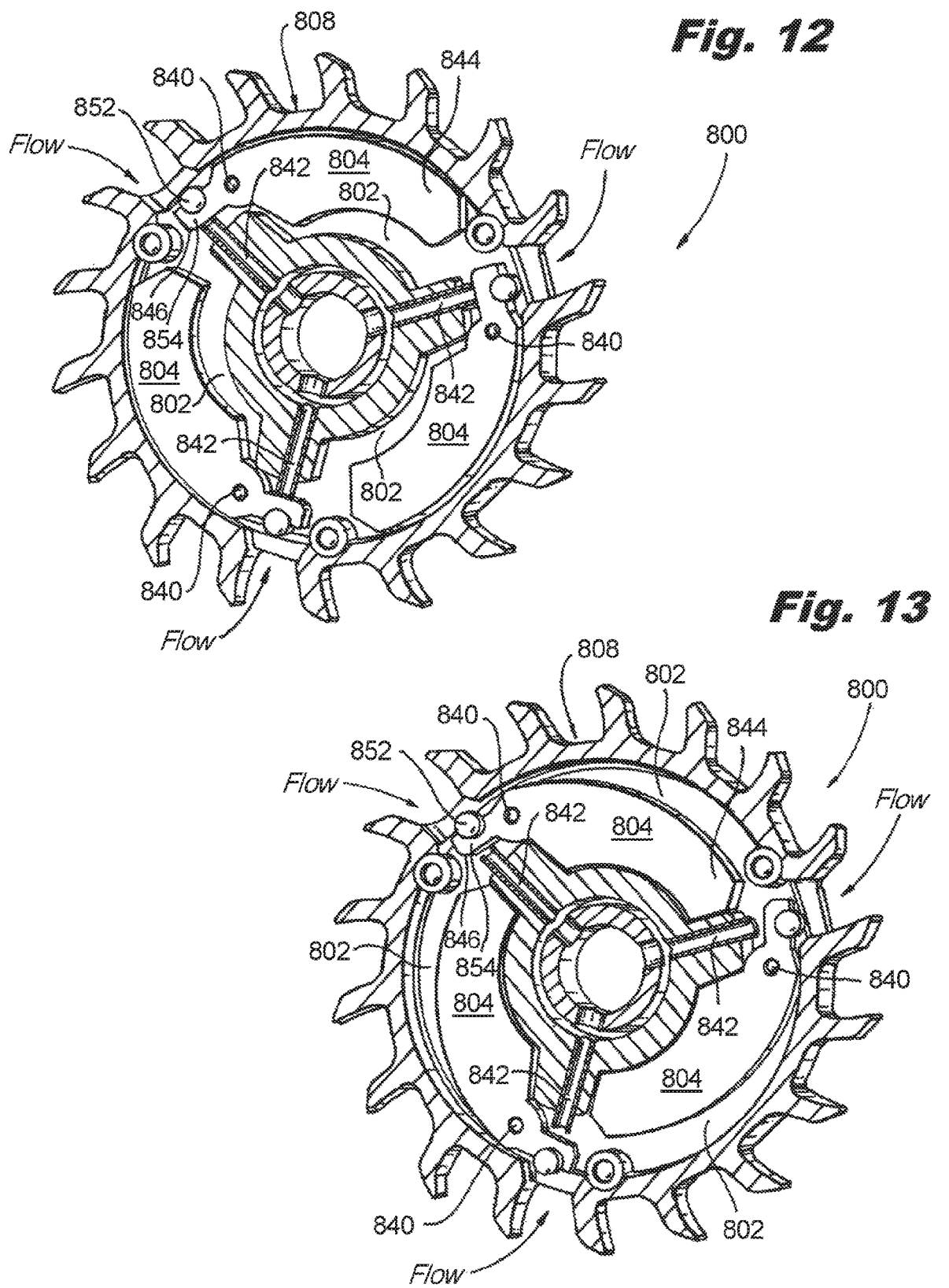

DENSITY-BASED FLUID FLOW CONTROL DEVICES

CROSS-REFERENCE TO RELATED APPLICATION

This application claims the benefit of priority to U.S. Patent Application Ser. No. 62/613,948 filed Jan. 5, 2018 the disclosure of which is herein incorporated by reference in its entirety.

BACKGROUND OF THE INVENTION

1. Field of the Invention

The present disclosure relates generally to devices for use in controlling fluid flow. More specifically, but not by way of limitation, this disclosure relates to density-based fluid flow control devices.

2. Description of Related Art

Production tubing and other equipment can be installed in a wellbore of a well system (e.g., an oil or gas well) for communicating fluid in the wellbore to the well surface. The resulting fluid at the well surface is referred to as production fluid. Production fluid can include a mix of different fluid components, such as oil, water, and gas, and the ratio of the fluid components in the production fluid can change over time. This can make it challenging for a well operator to control which types of fluid components are produced from the wellbore. For example, it can be challenging for a well operator to produce mostly oil from the wellbore, while reducing or eliminating the production of gas or water from the wellbore.

The conventional techniques have been considered satisfactory for their intended purpose. However, there is an ever present need for improved fluid flow control devices. This disclosure provides a solution for this need.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain Figures, wherein:

FIG. 12 is a schematic cross-sectional view of a fluid flow control device according to some aspects, showing the float components with counterweights in the closed position;

FIG. 13 is a schematic cross-sectional view of the fluid flow control device of FIG. 12, showing the float components with counterweights in the open position;

DETAILED DESCRIPTION OF THE PREFERRED EMBODIMENTS

Figure 1:
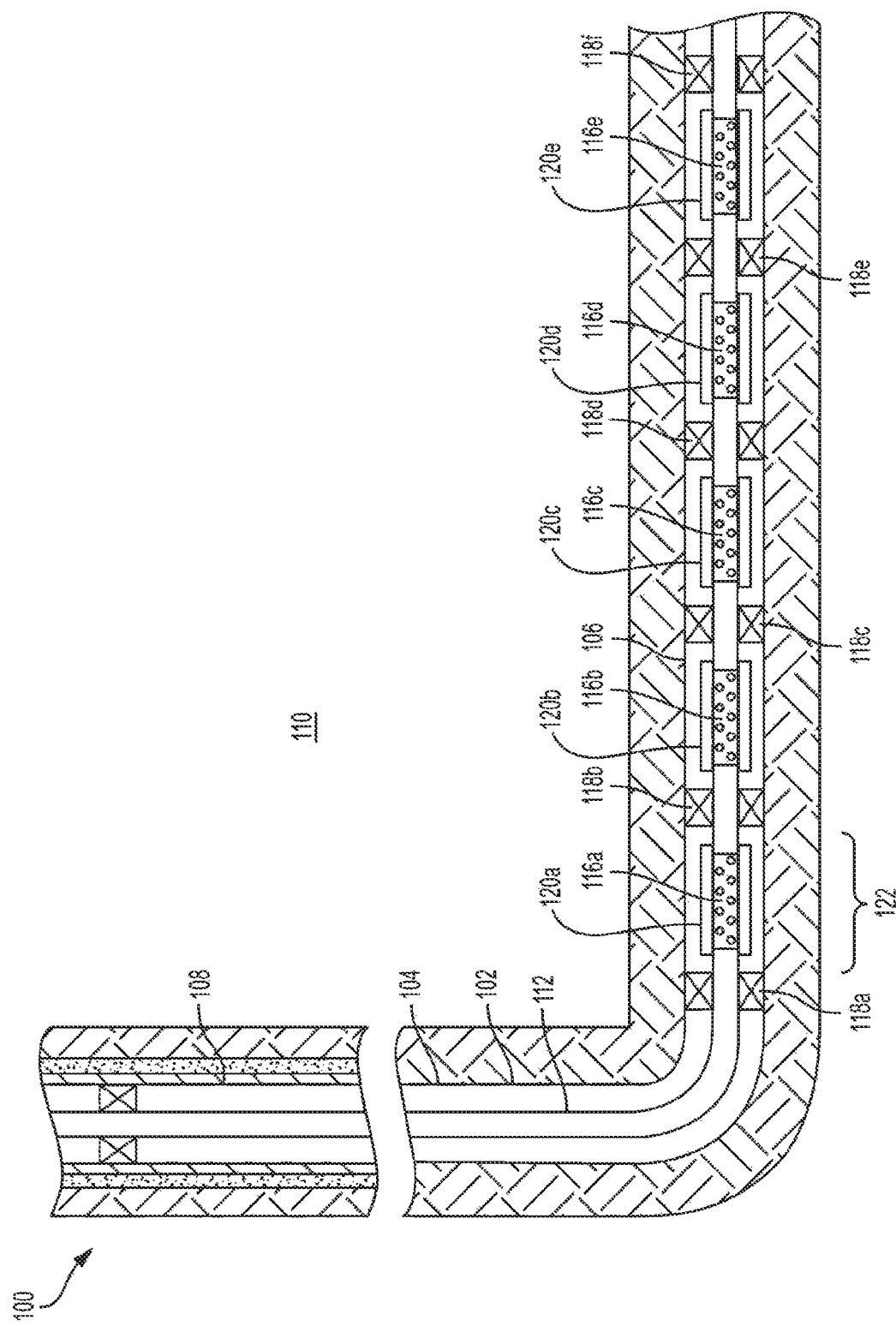
FIG. 1 is a cross-sectional side view of an example of a well system according to some aspects.

Reference will now be made to the drawings wherein like reference numerals identify similar structural features or aspects of the subject disclosure. For purposes of explanation and illustration, and not limitation, a partial view of an exemplary embodiment of a well system in accordance with the disclosure is shown in FIG. 1 and is designated generally by reference character 100. Other embodiments of well systems in accordance with the disclosure, or aspects thereof, are provided in FIGS. 2-15, as will be described. The systems and methods described herein can be used to control flow of fluids based on density of the fluids.

Certain aspects and features of the present disclosure relate to a fluid flow control device that can toggle between an open position that enables fluid flow through the fluid flow control device and a closed position that restricts (e.g., prevents) fluid flow through the fluid flow control device based on a density of the fluid. In one example, the fluid flow control device includes an inlet port, an outlet port, and a rotatable component for rotating about an axis in response to fluid flow from the inlet port. The rotatable component includes a float component that can move between (i) an open position that enables fluid flow from the inlet port to the outlet port, and (ii) a closed position that restricts fluid flow from the inlet port to the outlet port. The float component can move to the closed position when a higher-density fluid, such as water, flows through the fluid flow control device at least in part due to a force that is applied to the float component as the rotatable component rotates. When the hinge is used as described below, the float component can move to either the open or closed position with the higher density fluid, depending on which side of the hinge the flow passage is on. This can prevent the higher-density fluid from flowing out the outlet port. And the float component can move to the open position when a lower-density fluid, such as oil or gas, flows through the fluid flow control device at least in part due to the force. This can enable the lower-density fluid to flow out the outlet port. In this manner, the fluid flow control device can selectively control fluid flow to the outlet port based on the density of the fluid.

In some examples, applying the force to the float component by rotating the rotatable component can improve the ability of the float component to toggle between the open and closed positions, as discussed in greater detail below. The force can also make the fluid flow control device insensitive to orientation, because the force can overcome the effects of gravity. This can enable the fluid flow control device to be used in a variety of settings and positionings that may be impractical for other types of fluid flow control devices.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional side view of an example of a well system 100 according to some aspects. The well system 100 includes a wellbore 102 extending through various earth strata of a subterranean formation 110. In this example, the wellbore 102 has a substantially vertical section 104 and a substantially horizontal section 106. The substantially vertical section 104 may include a casing string cemented at an upper portion of the substantially vertical section 104.

A tubing string 112 extends from the well's surface to within wellbore 102. The tubing string 112 can provide a conduit for fluid (e.g., production fluid) to travel from the substantially horizontal section 106 to the well's surface. The tubing string 112 can include production tubular sections 116a-e at various production intervals adjacent to the subterranean formation 110. Packers 118a-f can be positioned on the left and right sides of production tubular sections 116a-e to define production intervals (e.g., production interval 122) and provide fluid seals between the tubing string 112 and the wall of the wellbore 102.

The production tubular sections 116a-e can include inflow control devices 120a-e (ICDs). An inflow control device can control the volume or composition of the fluid flowing from a production interval into a production tubular section. For example, the production interval 122 may produce more than one type of fluid component, such as a mixture of water, steam, carbon dioxide, and natural gas. The inflow control device 120a can reduce or restrict the flow of fluid into the production tubular section 116a when the production interval 122 is producing a higher proportion of an undesirable fluid component, such as water. This can enable the other production intervals that are producing a higher proportion of a desired fluid component (e.g., oil) to contribute more to the production fluid at the well's surface, so that the production fluid has a higher proportion of the desired fluid component. In some examples, the inflow control devices 120a-e can be an autonomous inflow control devices (AICD) that can allow or restrict fluid flow into the production tubular sections 116a-e based on fluid density, without requiring signals from the well's surface by the well operator.

Although FIG. 1 depicts each production tubular section 116a-e having an inflow control device 120a-e, in other examples not every production tubular section 116a-e may have an inflow control device 120a-e. Also, the production tubular sections 116a-e (and the inflow control devices 120a-e) can be located in the substantially vertical section 104 additionally or alternatively to the substantially horizontal section 106. Further, any number of production tubular sections 116a-e with inflow control devices 120a-e, including one, can be used in the well system 100. In some examples, production tubular sections 116a-e with inflow control devices 120a-e can be disposed in simpler wellbores, such as wellbores having only a substantially vertical section 108. The inflow control devices 120a-e can be disposed in cased wells or in open-hole environments.

Figure 2:
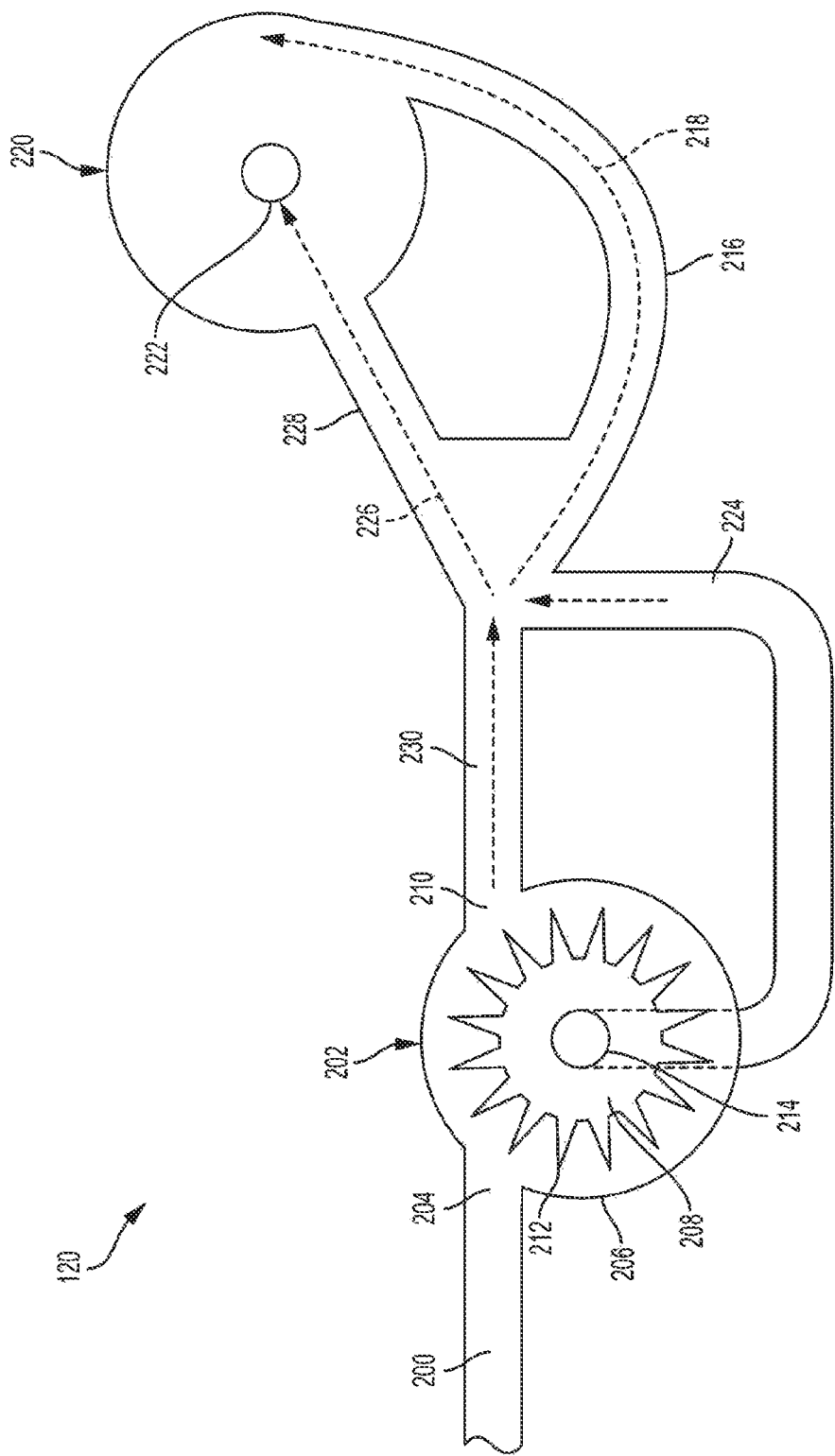
FIG. 2 is a cross-sectional view of an example of an inflow control device according to some aspects.

FIG. 2 is a cross-sectional view of an example of an inflow control device 120 according to some aspects. The inflow control device 120 can include an inflow tubular 200 of a well tool coupled to a fluid flow control device 202. Although the word "tubular" is used to refer to certain components in the present disclosure, those components can have any suitable shape, including a non-tubular shape. The inflow tubular 200 can provide fluid to the fluid flow control device 202. The fluid can be provided from a production interval in a well system or from another location. The inflow tubular 200 can terminate at an inlet port 204 that provides a fluid communication pathway into the fluid flow control device 202. In some examples, the inlet port 204 is an opening in a housing 206 of the fluid flow control device 202.

A first fluid portion can flow from the inlet port 204 toward a bypass port 210. The first fluid portion can push against protrusions 212 (e.g., fins) extending outwardly from a rotatable component 208 to cause the rotatable component 208 to rotate about an axis, such as a central axis. Rotation of the rotatable component 208 about the axis can generate a force on a float component (not shown) positioned within the rotatable component 208, as described in greater detail with respect to FIG. 3. After passing by the rotatable component 208, the first fluid portion can exit the fluid flow control device 202 via the bypass port 210. From the bypass port 210, the first fluid portion can flow through a bypass tubular 230 to a tangential tubular 216. The first fluid portion can flow through the tangential tubular 216, as shown by dashed arrow 218, into a vortex valve 220. The angle at which the first fluid portion enters the vortex valve 220 can cause the first fluid portion to spin around an outer perimeter of the vortex valve 220. Forces can act on the first fluid portion, eventually causing the first fluid portion to flow into a central port 222 of the vortex valve 220. The first fluid portion can be then communicated from the central port 222 elsewhere, such as to a well surface as production fluid.

At the same time, a second fluid portion from the inlet port 204 can flow into the rotatable component 208 via holes in the rotatable component 208 (e.g., holes between the protrusions 212 of the rotatable component 208). If the density of the second fluid portion is high, the float component can move to a closed position. This can prevent the second fluid portion from flowing to an outlet port 214, and instead cause the second fluid portion to flow out the bypass port 210. If the density of the second fluid portion is low (e.g., if the second fluid portion is mostly oil or gas), the float component can move to an open position that enables the second fluid portion to flow out the outlet port 214 and into a control tubular 224. In this manner, the fluid flow control device 202 can autonomously direct fluids through different pathways based on the densities of the fluids. The control tubular 224 can direct the second fluid portion, along with the first fluid portion, toward the central port 222 of the vortex valve 220 via a more direct fluid pathway, as shown by dashed arrow 226 and defined by tubular 228. The more direct fluid pathway to the central port 222 can enable the second fluid portion to more directly flow into the central port 222, without first spinning around the outer perimeter of the vortex valve 220. If the bulk of the fluid enters the vortex valve 220 along the pathway defined by dashed arrow 218, then the fluid will tend to spin before exiting through the central port 222 and will have a high fluid resistance. If the bulk of the fluid enters the vortex valve 220 along the pathway defined by dashed arrow 226, then the fluid will tend to exit through the central port 222 without spinning and will have minimal flow resistance.

In some examples, the above-mentioned concepts can be enhanced by the rotation of the rotatable component 208. Typically, the buoyancy force generated by the float component is small because the difference in density between the lower-density fluid and the higher-density fluid is generally small, and there is only a small amount (e.g., 5 milli-Newtons) of gravitational force acting on this difference in density. This can make the fluid flow control device 202 sensitive to orientation, can cause the float component to get stuck in the open position or the closed position, and have other disadvantages. But rotation of the rotatable component 208 can create a force (e.g., a centripetal force or a centrifugal force) on the float component. The force can act as artificial gravity that is much higher than the small gravitational force naturally acting on the difference in density. This can enable the fluid flow control device 202 to more reliably toggle between the open and closed positions based on the density of the fluid. This can also make the fluid flow control device 202 perform in a manner that is insensitive to orientation, because the force generated by the rotatable component 208 is much larger than the naturally occurring gravitational force.

In some examples, the fluid flow control device 202 can direct a fluid along the more direct pathway shown by dashed arrow 226 or along the tangential pathway shown by dashed arrow 218. Whether the fluid flow control device 202 directs the fluid along the pathway shown by dashed arrow 226 or the dashed arrow 218 can depend on the composition of the fluid. Directing the fluid in this manner can cause the fluid resistance in the vortex valve 220 to change based on the composition of the fluid.

The fluid flow control device 202 can be used with any type of valve. For example, although FIG. 2 includes a vortex valve 220, in other examples the vortex valve 220 can be replaced with other types of fluidic valves, including valves that have a moveable valve-element, such as a rate controlled production valve. Also, in some examples, the fluid control device 202 can operate as a pressure sensing module in a valve.

Figure 3:
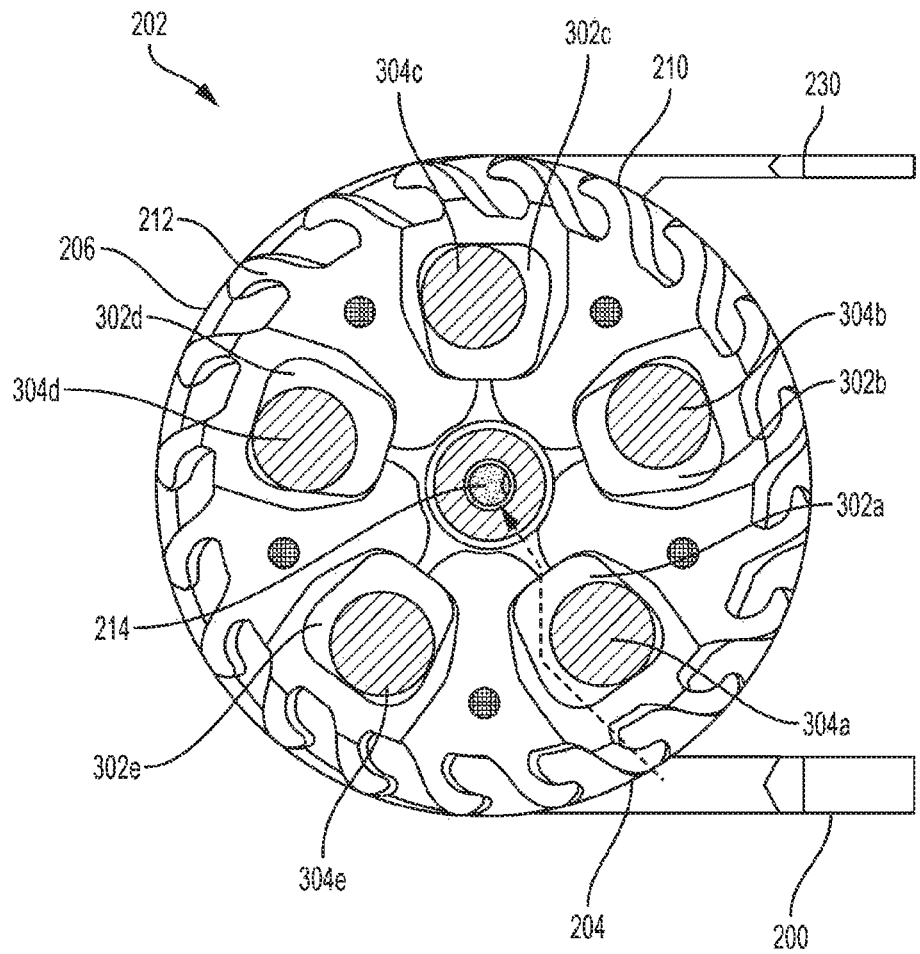
FIG. 3 is a cross-sectional view of an example of a fluid flow control device in an open position according to some aspects.

FIG. 3 is a cross-sectional view of an example of a fluid flow control device 202 in an open position according to some aspects. As discussed above, the fluid flow control device 202 can include a housing 206 to which an inflow tubular 200 and a bypass tubular 230 are coupled via an inlet port 204 and a bypass port 210, respectively. The housing 206 can have any suitable shape. In this example, the housing 206 has a circular shape.

The fluid flow control device 202 can also include a rotatable component 208, shown in FIG. 2. The rotatable component 208 can rotate about an axis (e.g., extending perpendicularly through the page), which can be a central axis extending through a center of the housing 206. In this example, the outlet port 214 forms the axis around which the rotatable component 208 can rotate. The rotatable component 208 can have one or more protrusions 212 extending radially outwardly from the axis and toward the housing 206. The protrusions 212 can have any suitable shape and size for interacting with fluid flowing between the inlet port 204 and the outlet port 214 to cause the rotatable component 208 to rotate.

The rotatable component 208 can include one or more fluid pathways for communicating fluid from outside the rotatable component 208 to the outlet port 214. In the example shown in FIG. 3, there are five fluid pathways, one of which is represented by a dashed arrow. Each fluid pathway can extend from a respective opening in the rotatable component 208 (for receiving fluid from the inlet port 204), into to a respective chamber 302a-e, and then to the outlet port 214. Although the fluid pathways and chambers 302a-e are shown as being substantially identical in shape in FIG. 3, in other examples the fluid pathways and chambers 302a-e can have any number and combination of shapes.

The rotatable component 208 can also include float components 304a-e positioned in the chambers 302a-e. Positioning the float components 304a-e in the chambers 302a-e can protect the float components 304a-e, improving the lifespan of the fluid flow control device 202. In the example shown in FIG. 3, there are five float components 304a-e positioned in five chambers 302a-e, with each respective chamber 302a-e having a respective float component 304a-e. The float components 304a-e can be formed from any number and combination of materials. For example, the float components 304a-e can include a syntactic foam or with low-density hollow glass spheres that are bonded together with a ceramic, plastic, or an epoxy. As another example, the float components 304a-e can include a solid low-density material, such as acrylonitrile butadiene styrene (ABS), nylon, polyethylene, rubber, phenylene oxide (PPO), polyphenylene sulfide (PPS), or any combination of these.

The float components 304a-e can have any suitable sizes and shapes. For example, in FIG. 3, the float components 304a-e all have spherical shapes. But in other examples, the float components 304a-e can have cylindrical shapes, rectangular shapes, square shapes, triangular shapes, or any combination of these.

The float components 304a-e can also have any suitable density. In some examples, the density of a float component can be between a lower-density fluid and a higher-density fluid. Examples of the lower-density fluid can be oil or gas and an example of the higher-density fluid can be water or oil. If the density of the float component is between the lower-density fluid and the higher-density fluid, the float component can move outward to the open position when the lower-density fluid flows through the fluid flow control device 202 and move inward to the closed position when the higher-density fluid flows through the fluid flow control device 202. In other examples, the force generated by the rotatable component 208 can enable a float component to have a higher density than both the lower-density fluid and the higher-density fluid. For example, when the fluid flowing through the fluid flow control device 202 is the higher-density fluid, a fluid drag may be created that forces the float components 304a-e into the closed position, thereby restricting fluid flow to the outlet port 214. When the fluid flowing through the fluid flow control device 202 is the lower-density fluid, the force generated by rotating the rotatable component 208 may overcome the fluid drag and enable the float components 304a-e to move outwardly to the open position, allowing fluid to flow into the outlet port 214. Thus, the float components 304a-e need not have densities between the lower-density fluid and the higher-density fluid.

As discussed above, each float component 304a-e can move within a respective chamber 302a-e between (i) an open position that enables fluid flow from the inlet port 204 to the outlet port 214 and (ii) a closed position that restricts fluid flow from the inlet port 204 to the outlet port 214. The float components 304a-e can move between the open position and the closed position based on the density of the fluid flowing through the fluid flow control device 202 (e.g., in an autonomous manner). In the example shown in FIG. 3, the float components 304a-e are all in respective open positions, which can allow fluid to flow into the rotatable component 208, through the chambers 304a-e, past the float components 304a-e, and then into the outlet port 214. One of these fluid flow pathways is represented by the dashed arrow.

Figure 4:
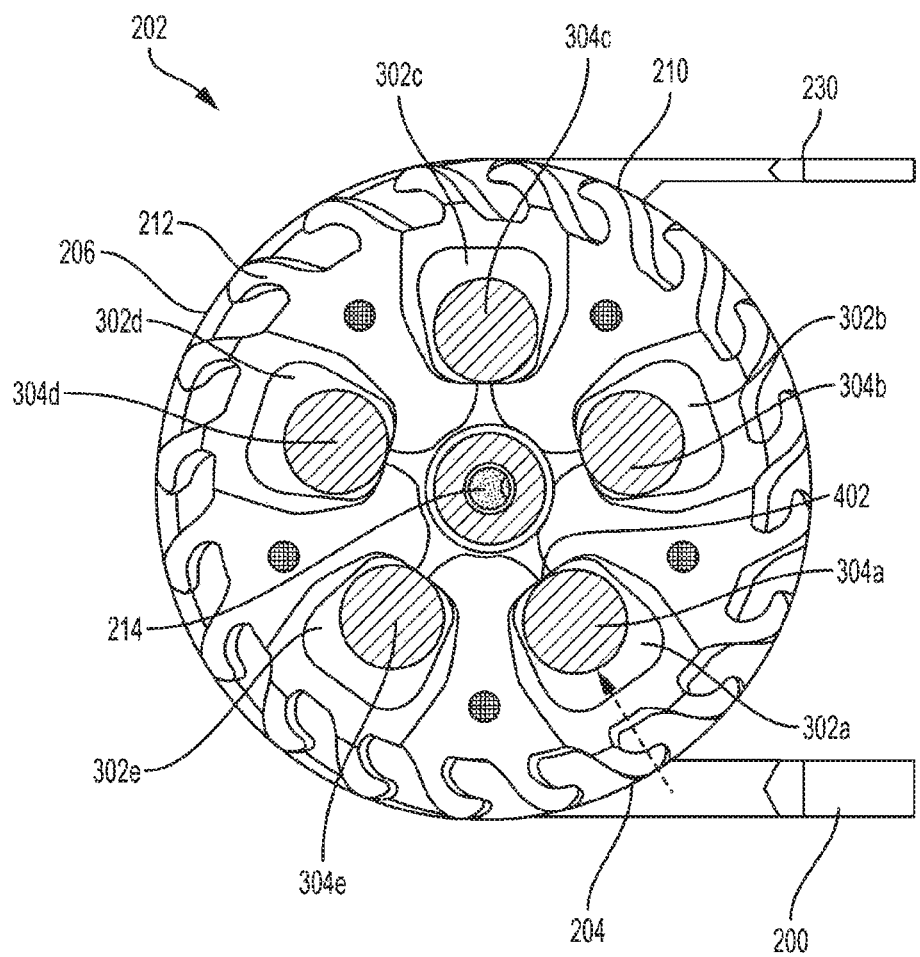
FIG. 4 is a cross-sectional view of an example of a fluid flow control device in a closed position according to some aspects.

FIG. 4 shows an example of the float components 304a-e in respective closed positions. When the float components 304a-e are in respective closed positions, they can restrict fluid flow to the outlet port 214, as indicated by a dashed arrow. In the example shown in FIG. 4, the float components 304a-e themselves are restricting fluid flow to the outlet port 214 by pressing into respective seats, such as seat 402, in the chambers 304a-e to create fluid seals. But in other examples, the float components 304a-e can interact with intermediary components (e.g., poppets or hinges) to restrict or allow fluid flow to the outlet port 214. The intermediary components may be more specifically shaped and sized to fit into the seat than the float components 304a-e and may therefore provide a better fluid seal than the float components 304a-e. As a particular example, when the fluid flowing through the fluid flow control device 202 has a higher density, a float component can push a poppet (positioned in a chamber) into a seat to form a fluid seal, thereby restricting fluid flow to the outlet port 214. When the fluid flowing through the fluid flow control device 202 has a lower density, the float component can release the poppet from the seat to enable fluid flow to the outlet port 214.

Figure 5:
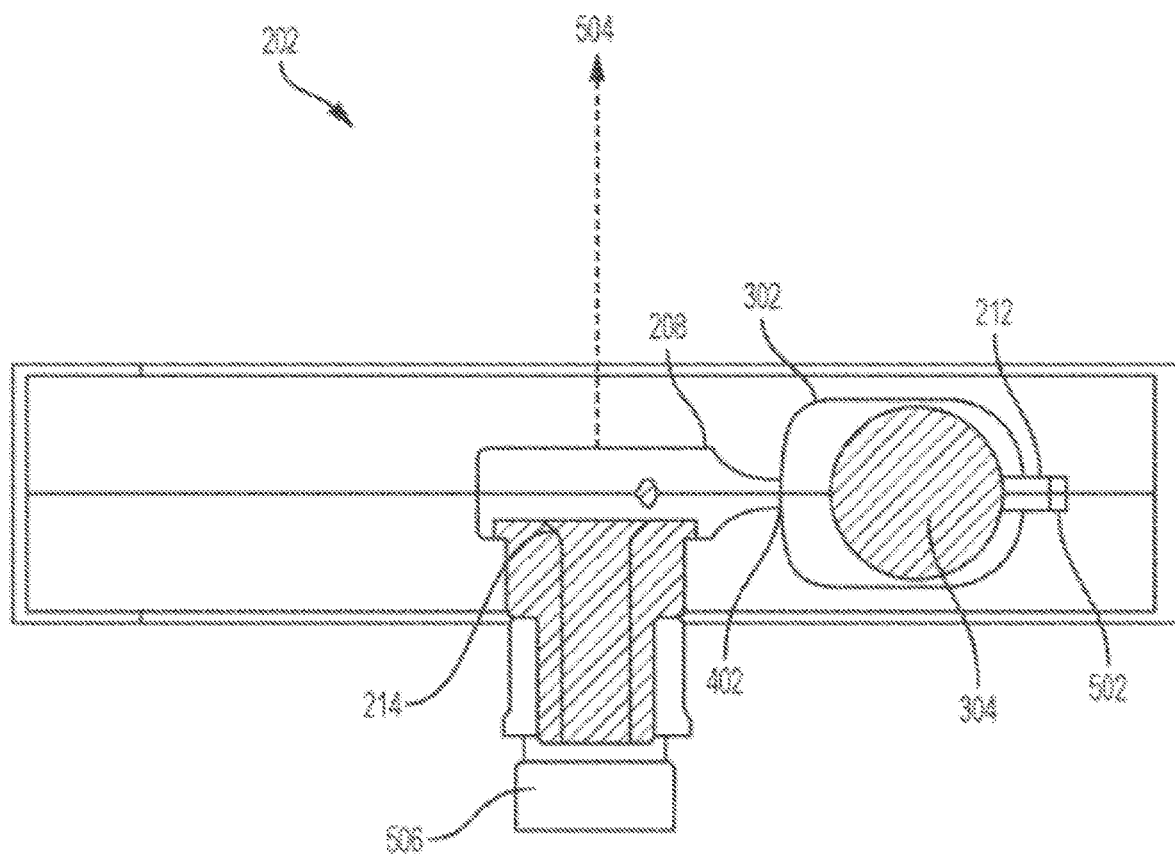
FIG. 5 is a cross-sectional side view of an example of a fluid flow control device according to some aspects.

FIG. 5 is a cross-sectional side view of an example of a fluid flow control device 202 according to some aspects. In this example, the inlet and bypass ports are not shown for clarity. The fluid flow control device 202 includes a rotatable component 208 that has a single fluid pathway extending from an opening 502 in a protrusion 212, into a chamber 302, past a float component 304, and into the outlet port 214. The rotatable component 208 can rotate about axis 504 to generate a force on the float component 304. The float component 304 can move between an open position and a closed position, as discussed above. When the float component 304 is in the open position (e.g., as shown in FIG. 5), fluid can pass through the outlet port 214 into a pipe 506, which can be a base pipe, a control tubular, or another pipe.

Figure 6:
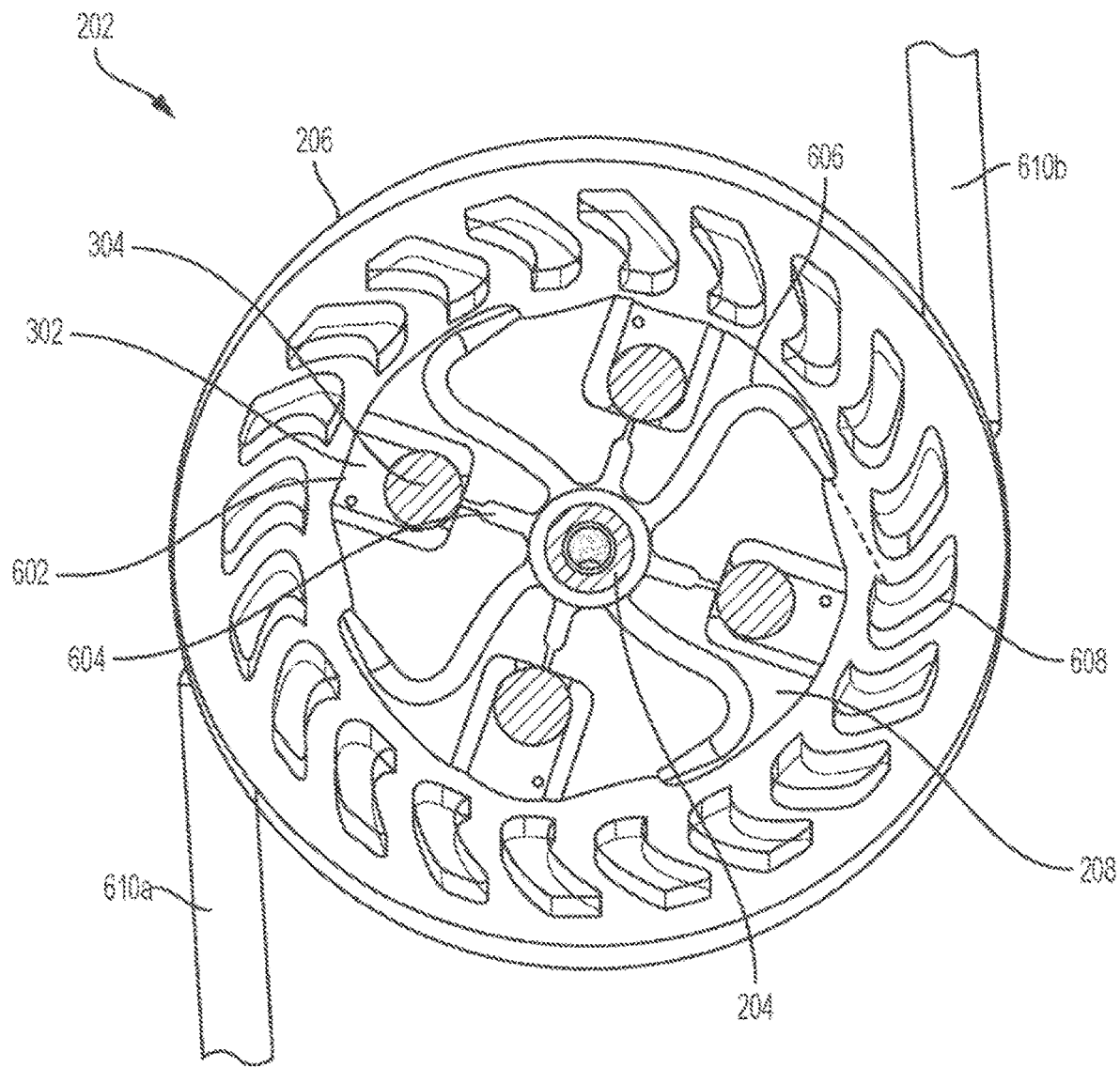
FIG. 6 is a cross-sectional view of another example of a fluid flow control device according to some aspects.

FIG. 6 is a cross-sectional view of another example of a fluid flow control device 202 according to some aspects. The fluid flow control device 202 can include a housing 206 having a rotatable component 208. The rotatable component 208 can rotate about an axis, which can be a central axis extending through a center of the housing 206. In this example, the inlet port 204 forms the axis around which the rotatable component 208 can rotate.

The rotatable component 208 can include one or more fluid pathways for communicating fluid from inside the rotatable component 208 to outside the rotatable component 208 toward outlet ports and tubulars 610a-b (e.g., control tubulars for controlling an inflow control device in some examples). In this example, there are four such fluid pathways. An example of such a fluid pathway is fluid pathway 604. Fluid can flow, via the fluid pathway 604, from the inlet port 204 toward the float component 304 positioned in the chamber 302. If the fluid is a higher-density fluid, the float component 304 can move into a closed position that creates a fluid seal and prevents the fluid from flowing out of the chamber 302 to the outlet ports 214a-b. If the fluid is a lower-density fluid, the float component 304 can move into an open position that enables fluid flow out of the chamber 302 to the outlet ports.

The float component 304 can be maintained in the chamber 302 using one or more maintaining devices to prevent the float component 304 from being ejected from the chamber (e.g., as the rotatable component 208 rotates). For example, the float component 304 can be attached to a wall of the chamber 302 via a cord to prevent the float component 304 from exiting the chamber 302. As another example, a wire can be attached along an opening 602 of the chamber 302 to prevent the float component 304 from exiting the chamber 302. As yet another example, a protrusion can extend into the opening 602 of the chamber 302, which may reduce a diameter of the opening 602 to smaller than a diameter of the float component 304 to prevent the float component 304 from exiting the chamber 302. In some examples, the opening 602 may contain a narrow fluid pathway so that the float component 304 creates a flow restriction when the float component 304 presses against the narrow fluid pathway. In such an example, the rotatable component 208 can pass fluid when the fluid density is high (e.g., when the fluid is water) and restrict fluid passage when the fluid density is low (e.g., when the fluid is gas or oil).

The rotatable component 208 can also include one or more other types of fluid pathways, such as one or more fluid stream pathways for generating a fluid stream that causes the rotatable component 208 to rotate. FIG. 6 shows an example of a fluid stream pathway 606 generating a fluid stream, which is represented by a dashed line. The fluid stream pathway 606 can create a fluid stream that projects outwardly from the rotatable component 208 at relatively high pressure. In some examples, the fluid stream can impact a stationary component 608, which can be in a fixed position in the housing 206, or a wall of the housing 206. The impact of the fluid stream can cause the rotatable component 208 to rotate. The rotatable component 208 can include any number and combination of fluid stream pathways for generating any number and combination of fluid streams. The fluid stream pathways can have any suitable shape, such as the "7" shape shown in FIG. 6 or another shape. And the housing 206 can include any number (including zero) and combination of stationary components for facilitating rotation of the rotatable component 208. The stationary components can also have any suitable shape, such as the "U" shape shown in FIG. 6 or another shape.

Fluid can flow through the fluid pathways (e.g., fluid pathway 604 and fluid stream pathway 606) substantially simultaneously, causing the rotatable component 208 to rotate and generate a force on the float components. The force can improve the ability of the float components to toggle between the closed position and the open position, for example, as discussed above with respect to FIG. 2. In some examples, if the rotatable component 208 is rotated fast enough and the float components have sufficient mass, the float components can overcome any fluid pressure tending to bias the float components in their open positions, enabling the float components to toggle to the closed position.

Figure 7:
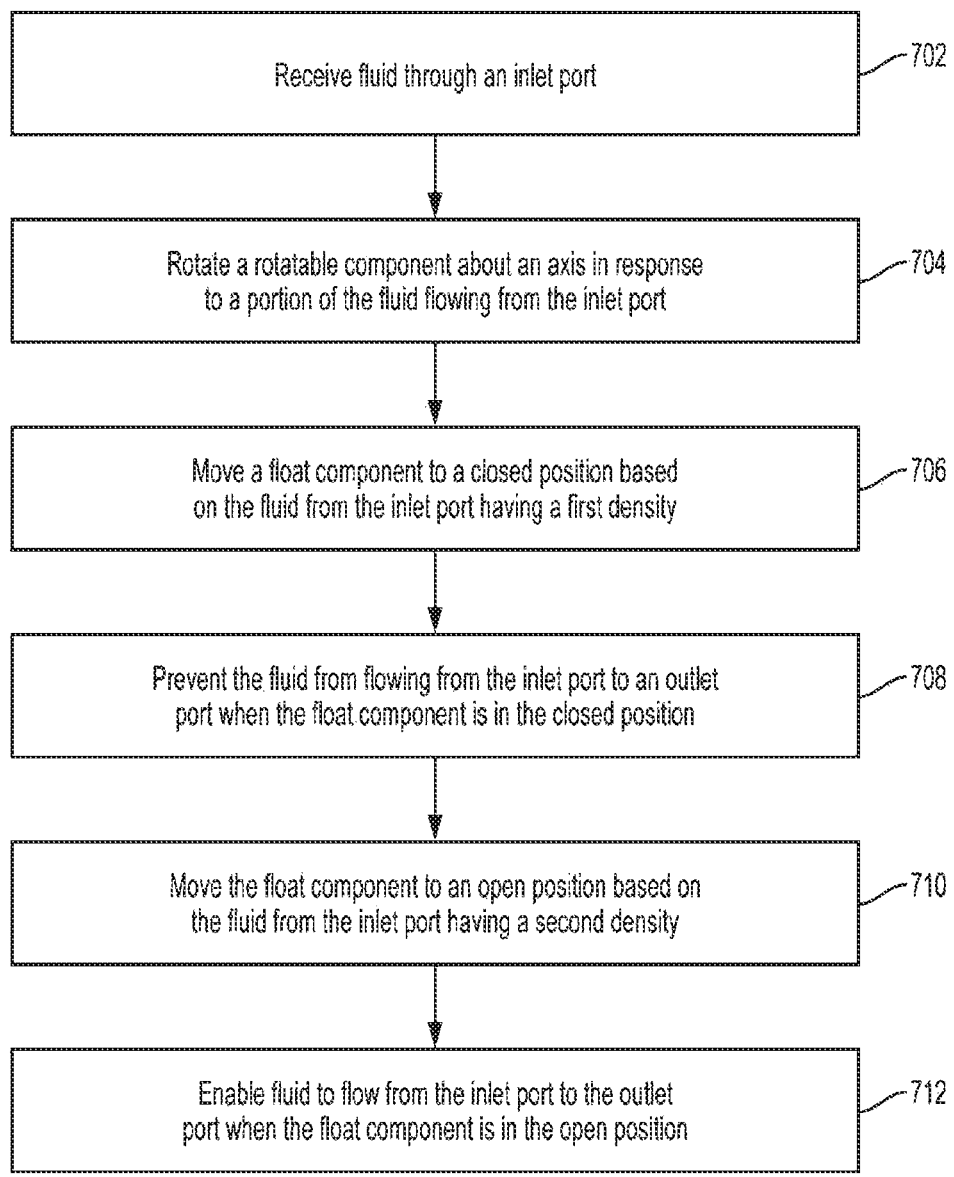
FIG. 7 is a flow chart of an example of a process for using a fluid flow control device according to some aspects.

FIG. 7 is a flow chart of an example of a process for using a fluid flow control device 202 according to some aspects. Some examples can include more steps, fewer steps, different steps, or a different order of the steps than depicted in FIG. 7. The steps below will be described with reference to the components discussed above.

In block 702, the fluid flow control device 202 receives fluid through an inlet port 204. The fluid can be formed from a mix of fluid components or have a single type of fluid component.

In block 704, the fluid flow control device 202 rotates a rotatable component 208 about an axis in response to a portion of the fluid flowing from the inlet port 204. The axis can be a central axis, such as axis 504.

In block 706, the fluid flow control device 202 moves a float component 304 to a closed position based on the fluid from the inlet port 204 having a first density. In some examples, the fluid flow control device 202 moves the float component 304 from an open position to the closed position based on the fluid from the inlet port 204 having the first density. Movement of the float component 304 to the closed position can be effectuated by a first force being applied to the float component 304 as the rotatable component 208 rotates about the axis. Examples of the first force can be a centripetal force or a centrifugal force.

In block 708, the fluid flow control device 202 prevents the fluid from flowing from the inlet port 204 to an outlet port 214 when the float component 304 is in the closed position. For example, the float component 304 can be pressed into a seat 402 that forms a fluid seal, preventing the fluid from flowing to the outlet port 214.

In block 710, the fluid flow control device 202 moves the float component 304 to the open position based on the fluid from the inlet port 204 having a second density. The second density can be lower than the first density. In some examples, the fluid flow control device 202 moves the float component 304 from the closed position to the open position based on the fluid from the inlet port 204 having the first density. Movement of the float component 304 to the open position can be effectuated by a second force being applied to the float component 304 as the rotatable component 208 rotates about the axis. Examples of the second force can be a centripetal force or a centrifugal force. The second force can be the same as or different from the first force.

In block 712, the fluid flow control device 202 enables the fluid to flow from the inlet port 204 to the outlet port 214 when the float component 304 is in the open position. For example, the float component 304 can lift off the seat 402, enabling the fluid to flow to the outlet port 214.

Figure 8:
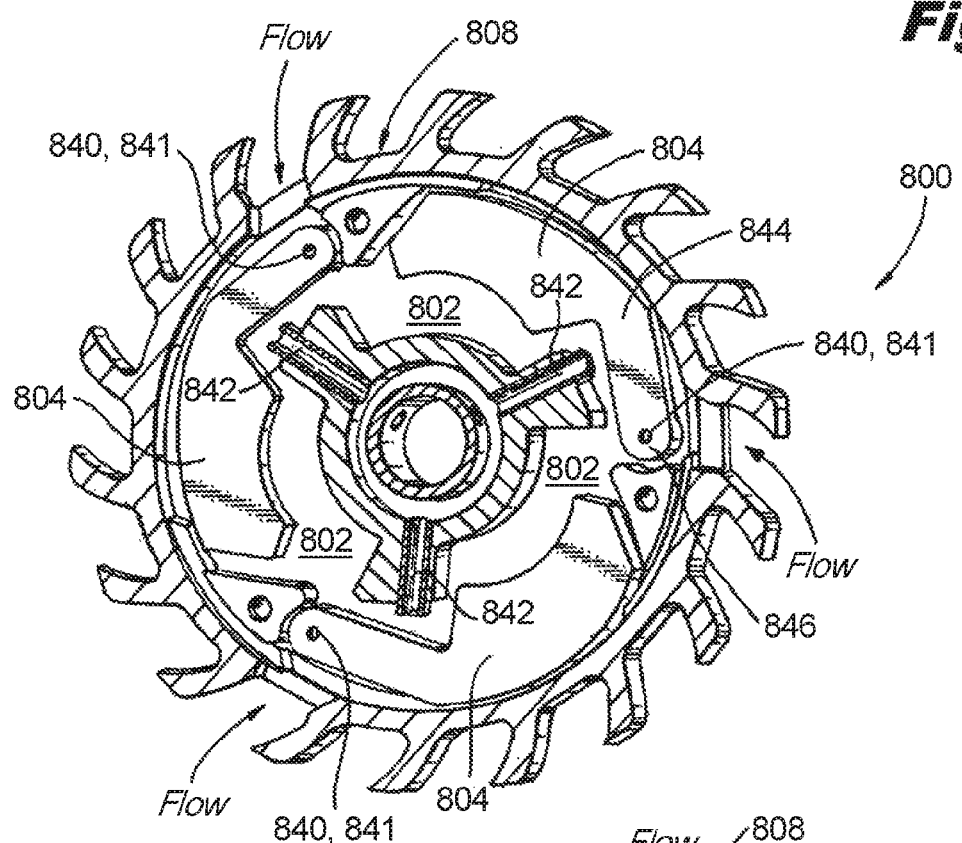
FIG. 8 is a schematic cross-sectional view of a fluid flow control device according to some aspects, showing the float components in the open position.
Figure 9:
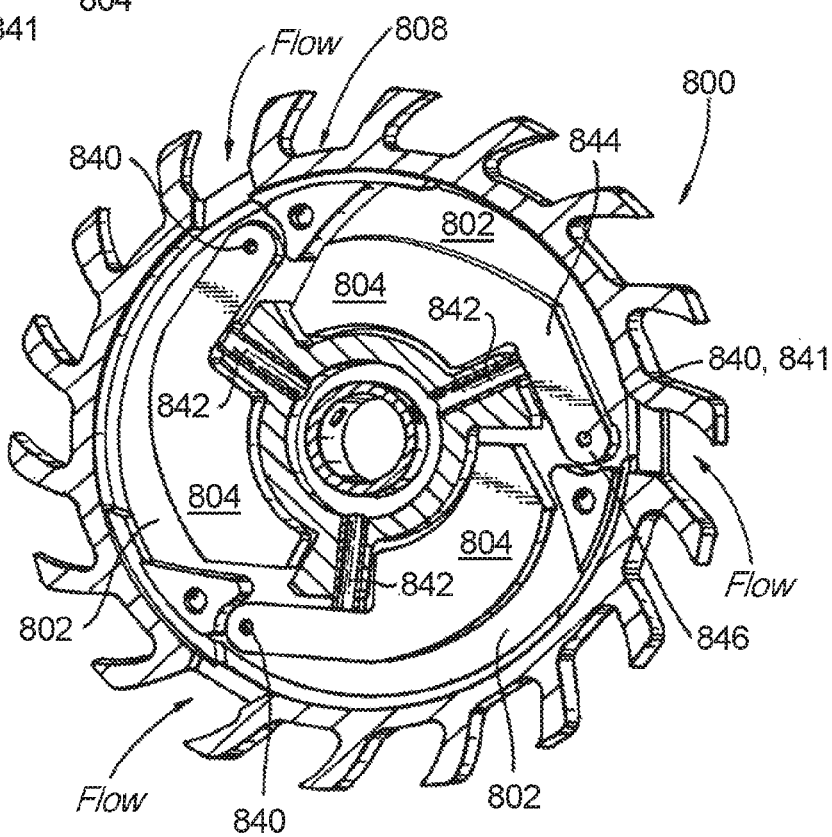
FIG. 9 is a schematic cross-sectional view of the fluid flow control device of FIG. 8, showing the float components in the closed position.

With reference now to FIG. 8, a fluid flow control device 800 includes a rotatable component 808 for rotating about an axis, e.g. axis 504 shown in FIG. 5, in response to fluid flow from an inlet port, e.g. inlet port 204 shown in FIG. 3, of the fluid flow control device, much as described above. The system, e.g., system 100, can include a circular housing, e.g., circular housing 206 shown in FIG. 4, in which the rotatable component 808 is positioned. A float component 804 is positioned within the rotatable component 808 and is connected to the rotatable component 808 by a hinge 840, wherein the hinge 840 provides for movement of the float component 804 relative to the rotatable component 808 between the open and closed positions based on fluid densities as described above, wherein FIG. 8 shows the three float components 804 in the open position, and FIG. 9 shows them in the closed position.

Movement of the float components 804 back and forth between the open and closed positions is accomplished by hinging each respective float component 804 on its respective hinge 840. The float components 804 can be configured to move back and forth from the open and closed positions in response to changes in the average density of fluids, including mixtures of water, hydrocarbon gas, and/or hydrocarbon liquids, introduced at the inlet port. For example, The float components 804 can be movable from the open position to the closed position in response to the fluid from the inlet port being predominantly water, wherein the float component is movable from the closed position to the open position in response to the fluid from the inlet port being predominantly a hydrocarbon.

In another aspect, the rotatable component 808 includes a plurality of fluid pathways 842 providing fluid communication between the inlet port and the outlet port, each respective fluid pathway 842 having a respective chamber 802 and a respective float component 804 disposed in the respective chamber 802, for enabling or disabling fluid flow through the respective fluid pathway 842 based on a density of a fluid from the inlet port. In the example shown in FIGS. 8 and 9, there are three chambers 802, three fluid pathways 842, and three float components 804. However, those skilled in the art having the benefit of this disclosure will readily appreciate that any suitable number of respective chambers, fluid passages, and floats can be used without departing from the scope of this disclosure.

Figure 10:
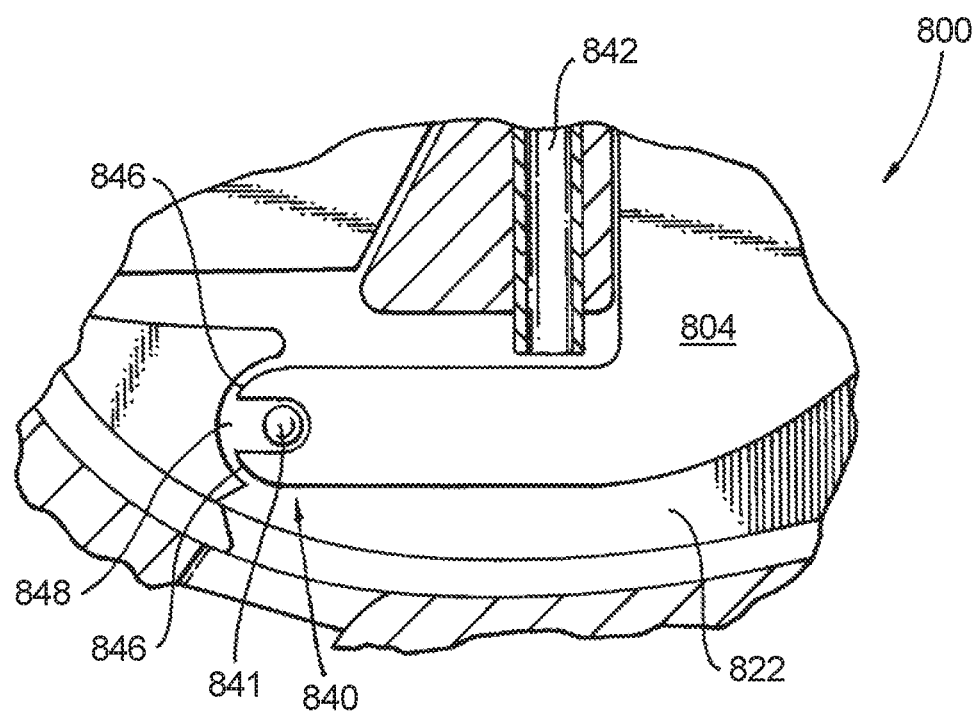
FIG. 10 is a schematic cross-sectional view of a portion of a fluid flow control device according to some aspects, showing an open ended hinge or guide.
Figure 11:
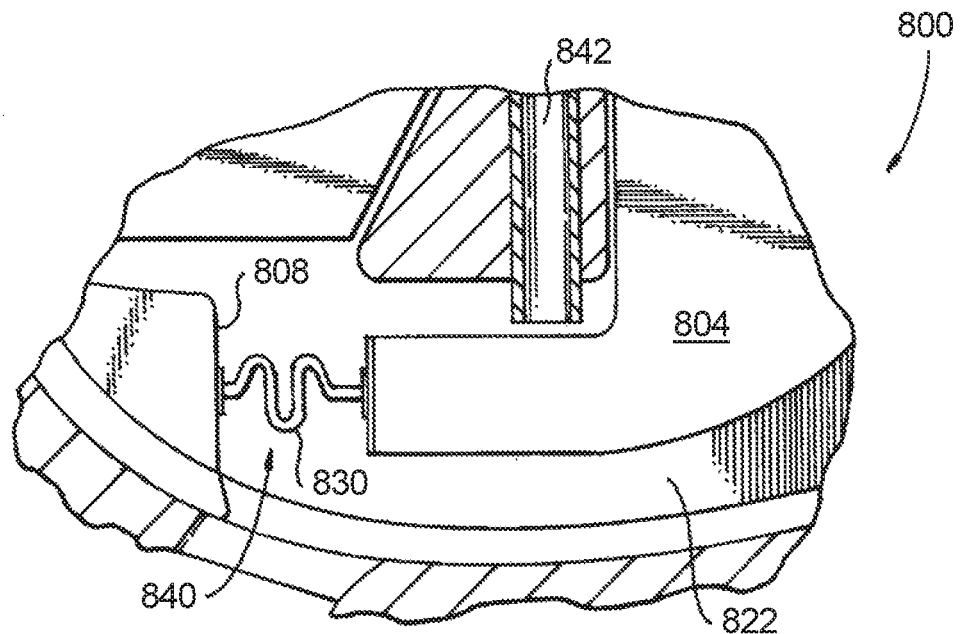
FIG. 11 is a schematic cross-sectional view of a portion of a fluid flow control device according to some aspects, showing a flexure hinge.
Figure 14:
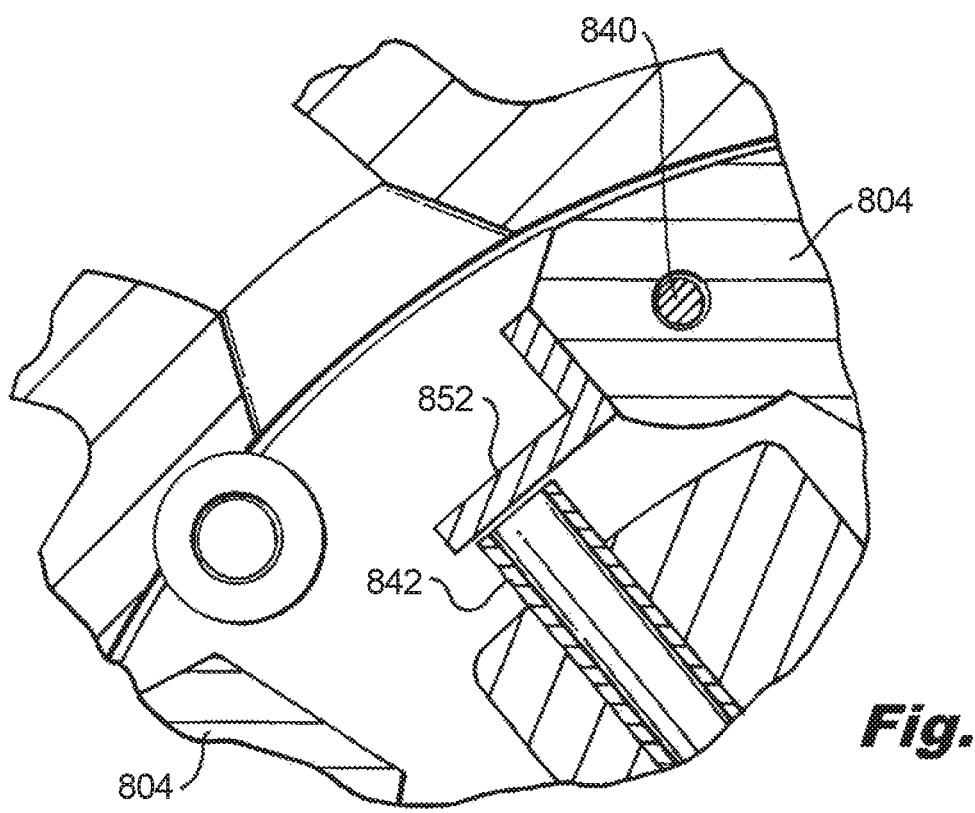
FIG. 14 is a schematic cross-sectional view of a portion of a fluid flow control device according to some aspects, showing a counterweight that obstructs the flow passage with the float component in the closed position.
Figure 15:
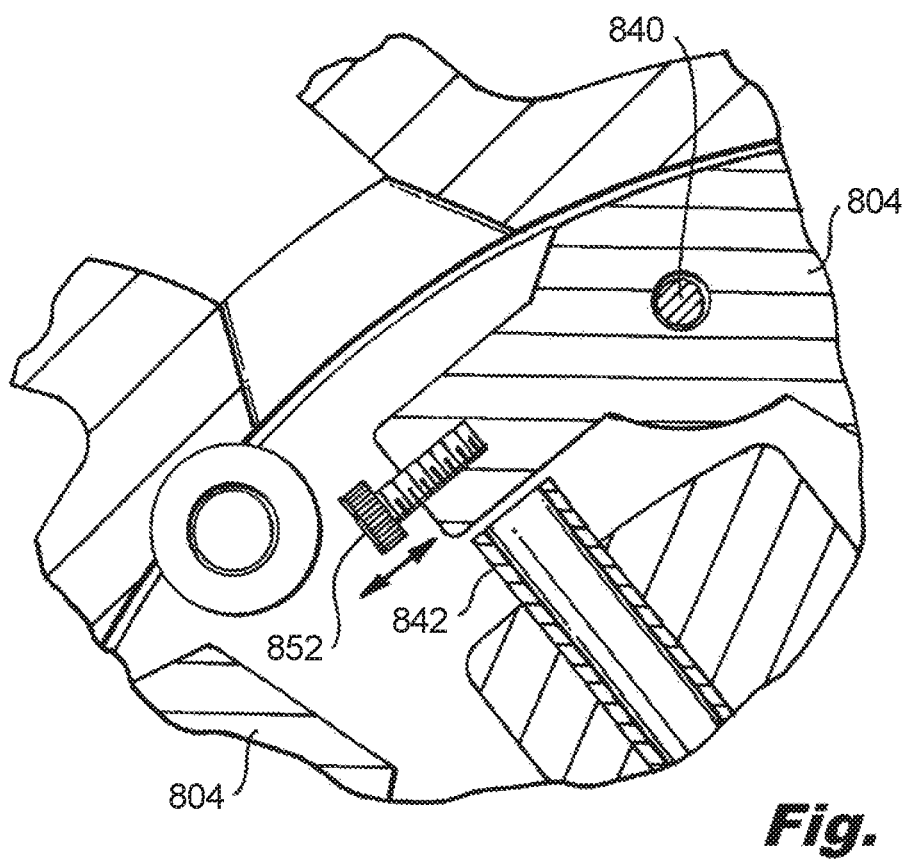
FIG. 15 is a schematic cross-sectional view of a portion of a fluid flow control device according to some aspects, showing a counterweight that is adjustably mounted to the float portion.

For each float component 804, the float component 804 includes a first portion 844 on one side of the hinge 840 and a second portion 846 on an opposite side of the hinge 840 from the first portion 844. The first portion 844 is larger than the second portion 846, and for sake of clarity only one of the float components 804 in FIG. 8 includes reference characters for the first and second portions 844 and 846. The first portion 844 obstructs the flow passage 842 with the float component 804 in the closed position as shown in FIG. 9. The hinge 840 can include a pivot rod 841 mounted to the rotatable component 808 and passing at least partially through the float component 804. In lieu of the pivot rod 840 mounted to the rotatable component, the float component 804 can have bump extensions that fit into recesses of the rotatable component 808 for use as the hinge 840. With reference to FIG. 10, in another example, the hinge 840 can include a pivot rod 841 mounted to the rotatable component 808 that is seated in an open ended hinge recess 848 of the float component 804. In this example, the second portion of the float component 804 includes the ends of the two tines of the float component 804 on either side of the open ended hinge recess 848. In another example shown in FIG. 11, the hinge 840 can include a flexure member 850 connecting between the rotatable component 808 and the float component 804.

Referring now to FIGS. 12 and 13, in another aspect, the float component 804 can have the first portion 844 and a second portion 846 much as described above, but wherein the second portion 846 obstructs the flow passage of fluid pathway 842 with the float component 804 in the closed position shown in FIG. 13. The second portion 846 of each float component 804 includes a counterweight 852 that is more dense than the first portion 844 of the float component 804. It is also contemplated that part 854 of the second portion 846 of the float component 804 between the counterweight 852 and the flow passage 842 can obstruct the flow passage 842 with the float component 804 in the closed position. In another example, shown in FIG. 14, the counterweight 852 itself can obstruct the flow passage 842 with the float component 804 in the closed position. In another example, the counterweight 552 is adjustably mounted to the float portion 804 to allow tuning of behavior of the float component 804, e.g., to tune the float portion 804 to provide a desired force profile for switching back and forth between the open and closed positions. In this example, counterweight 852 is threaded into the float component 804 and the position of the center of mass of the counterweight 852 relative to the hinge 840 can be adjusted by turning the counterweight 852 along the treads relative to the float component 804. This can allow for tuning for different float component performance in mixed flow, various well conditions, and/or compensating for variations in float material volume or density.

Using a hinge, e.g., hinge 840, to pivot the float components, e.g., float component 804, allows for leveraging the actuation of the float component making it easier to overcome the opening force required given a pressure differential at the opening of the flow passage, e.g., flow passages 842. This can allow for the use of denser, more robust materials for the float components without determent to the behavior of the flow device, e.g., an inflow control device 120. This leveraging can also allow for larger flow passages, e.g. flow passages 842, which can allow for higher flow rates than without hinges 840. Larger flow passages reduce the risk of plugging and can allow for increased flow rate of pilot flow to the external valve or fluidic device. It can also allow for higher pressure differentials across inflow control devices 120. With the greater opening and closing forces from leveraging over hinges 840, inflow control devices 120 can work at lower speeds than configurations without leveraged float components.

Accordingly, as set forth above, the embodiments disclosed herein may be implemented in a number of ways. For example, in general, in one aspect, the disclosed embodiments relate to a fluid flow control device. The fluid flow control device includes a rotatable component for rotating about an axis in response to fluid flow from an inlet port of the fluid flow control device. A float component is positioned within the rotatable component and connected to the rotatable component by a hinge, wherein the hinge provides for movement of the float component relative to the rotatable component between (i) an open position that enables fluid flow from the inlet port to an outlet port of the rotatable component, and (ii) a closed position that restricts fluid flow through a flow passage from the inlet port to the outlet port. The flow component is moveable to the closed position in response to a fluid from the inlet port having a first density and a centrifugal force being applied to the float component by rotating the rotatable component about the axis. The float component is movable to the open position in response to the fluid from the inlet port having a second density and a centrifugal force being applied to the float component by rotating the rotatable component about the axis, the first density being different from the second density.

In general, in another aspect, a method includes receiving, by a fluid flow control device, fluid through an inlet port of the fluid flow control device. The method includes rotating, by the fluid flow control device, a rotatable component about a central axis in response to a portion of the fluid flowing from the inlet port. It is also contemplated that the method includes hinging a float component positioned within the rotatable component to a closed position based on the fluid from the inlet port having a first density and a first force being applied to the float component as the rotatable component rotates about the central axis. The method includes preventing, by the float component in the closed position, the fluid from flowing from the inlet port to an outlet port of the fluid flow control device. The method includes hinging the float component to an open position based on the fluid from the inlet port having a second density and a second force being applied to the float component as the rotatable component rotates about the central axis. The method includes enabling, by the float component in the open position, the fluid to flow from the inlet port to the outlet port.

In another aspect, the fluid flow control device can be part of a system. The system can include a circular housing in which the rotatable component is positioned, wherein the axis is a central axis extending through a cross-sectional center of the circular housing. The float component can be movable from the open position to the closed position in response to the fluid from the inlet port being predominantly water, wherein the float component is movable from the closed position to the open position in response to the fluid from the inlet port being predominantly a hydrocarbon, or vice versa if the flow passage is on the other side of the hinge. The outlet port and a bypass port can be coupled to a vortex valve of an inflow control device. The inflow control device can be positioned in a well tool usable in a wellbore.

In another aspect, the rotatable component can include a plurality of fluid pathways between the inlet port and the outlet port, each respective fluid pathway of the plurality of fluid pathways having a respective chamber and a respective float component disposed in the respective chamber, connected to the rotatable component by a respective hinge, for enabling or disabling fluid flow through the respective fluid pathway based on a density of a fluid from the inlet port.

In another aspect, the float component includes a first portion on one side of the hinge and a second portion on an opposite side of the hinge from the first portion, wherein the first portion is larger than the second portion, and wherein the first portion obstructs the flow passage with the float component in the closed position. The hinge can include a pivot rod mounted to the rotatable component and passing at least partially through the float component. It is also contemplated that the hinge can include a pivot rod mounted to the rotatable component that is seated in an open ended hinge recess of the float component. It is also contemplated that the hinge can include at least one hinge extensions extending from the float component seated in a respective recess in the rotatable component.

In another aspect, the hinge can include a flexure member connecting between the float component and the rotatable component.

In another aspect, the float component can include a first portion on one side of the hinge and a second portion on an opposite side of the hinge from the first portion, wherein the first portion is larger than the second portion, and wherein the second portion obstructs the flow passage with the float component in the closed position. The second portion of the float component can include a counterweight that is more dense than the first portion of the float component. The counterweight can obstruct the flow passage with the float component in the closed position. It is also contemplated that part of the second portion of the float component between the counterweight and the flow passage can obstruct the flow passage with the float component in the closed position. The counterweight can be adjustably mounted to the float portion to allow tuning of behavior of the float component.

The methods and systems of the present disclosure, as described above and shown in the drawings, provide for fluid flow control devices with superior properties including leveraged float components. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fluid flow control device comprising:
a rotatable component; and
a float component positioned within the rotatable component and connected to the rotatable component by a hinge, wherein the hinge provides for movement of the float component relative to the rotatable component between
(i) an open position that enables fluid flow from an inlet port of the fluid flow control device to an outlet port of the rotatable component, and
(ii) a closed position that restricts fluid flow through a flow passage from the inlet port to the outlet port, the float component moveable to the closed position in response to a first fluid component from the inlet port having a first density and a centrifugal force being applied to the float component by rotating the rotatable component about an axis, and the float component being movable to the open position in response to a second fluid component from the inlet port having a second density and a centrifugal force being applied to the float component by rotating the rotatable component about the axis, the first density being different from the second density.

2. The fluid flow control device of claim 1, wherein the fluid flow control device further includes a circular housing in which the rotatable component is positioned; and the axis is a central axis extending through a cross-sectional center of the circular housing.

3. The fluid flow control device of claim 2, wherein the rotatable component comprises a plurality of fluid pathways between the inlet port and the outlet port, each respective fluid pathway of the plurality of fluid pathways having a respective chamber and a respective float component disposed in the respective chamber, connected to the rotatable component by a respective hinge, for enabling or disabling fluid flow through the respective fluid pathway based on a density of a fluid from the inlet port.

4. The fluid flow control device of claim 1, wherein the float component includes a first portion on one side of the hinge and a second portion on an opposite side of the hinge from the first portion, wherein the first portion is larger than the second portion, and wherein the first portion obstructs the flow passage with the float component in the closed position.

5. The fluid flow control device of claim 4, wherein
the hinge includes a pivot rod mounted to the rotatable component and passing at least partially through the float component; or
the hinge includes at least one hinge extensions extending from the float component seated in a respective recess in the rotatable component.

6. The fluid flow control device of claim 4, wherein the hinge includes a pivot rod mounted to the rotatable component that is seated in an open ended hinge recess of the float component.

7. The fluid flow control device of claim 1, wherein the hinge includes a flexure member connecting between the float component and the rotatable component.

8. The fluid flow control device of claim 1, wherein the float component includes a first portion on one side of the hinge and a second portion on an opposite side of the hinge from the first portion, wherein the first portion is larger than the second portion, and wherein the second portion obstructs the flow passage with the float component in the closed position.

9. The fluid flow control device of claim 8, wherein the second portion of the float component includes a counterweight that is more dense than the first portion of the float component.

10. The fluid flow control device of claim 9, wherein the counterweight obstructs the flow passage with the float component in the closed position.

11. The fluid flow control device of claim 9, wherein part of the second portion of the float component between the counterweight and the flow passage obstructs the flow passage with the float component in the closed position.

12. The fluid flow control device of claim 9, wherein the counterweight is adjustably mounted to the float portion to allow tuning of behavior of the float component.

13. The fluid flow control device of claim 1, wherein the float component is movable from the open position to the closed position in response to the first fluid component from the inlet port being predominantly water, and wherein the float component is movable from the closed position to the open position in response to the second fluid component from the inlet port being predominantly a hydrocarbon.

14. A system comprising:
a housing having an inlet port and an outlet port;
a rotatable component positioned in the housing; and
a float component disposed in a chamber of the rotatable component and connected to the rotatable component by a hinge, wherein the hinge provides for movement of the float component relative to the rotatable component between
(i) an open position that enables fluid flow from the inlet port to the outlet port, and
(ii) a closed position that restricts fluid flow through a flow passage from the inlet port to the outlet port, the float component movable from the open position to the closed position in response to a first fluid component from the inlet port having a first density and a first force being applied to the float component by rotating the rotatable component about a central axis of the rotatable component, and the float component being movable from the closed position to the open position in response to a second fluid component from the inlet port having a second density and a second force being applied to the float component by rotating the rotatable component about the central axis.

15. The system of claim 14, wherein the rotatable component comprises a plurality of fluid pathways between the inlet port and the outlet port, each respective fluid pathway of the plurality of fluid pathways having a respective chamber and a respective float component disposed in the respective chamber, connected to the rotatable component by a respective hinge, for enabling or disabling fluid flow through the respective fluid pathway based on a density of a fluid from the inlet port.

16. The system of claim 14, wherein the float component includes a first portion on one side of the hinge and a second portion on an opposite side of the hinge from the first portion, wherein the first portion is larger than the second portion, and wherein the first portion obstructs the flow passage with the float component in the closed position.

17. The system of claim 16, wherein the hinge includes a pivot rod mounted to the rotatable component and passing at least partially through the float component.

18. The system of claim 17, wherein the hinge includes a pivot rod mounted to the rotatable component that is seated in an open ended hinge recess of the float component.

19. The system of claim 14, wherein the hinge includes a flexure member connecting between the float component and the rotatable component.

20. The system of claim 14, wherein the float component includes a first portion on one side of the hinge and a second portion on an opposite side of the hinge from the first portion, wherein the first portion is larger than the second portion, and wherein the second portion obstructs the flow passage with the float component in the closed position.

21. The system of claim 20, wherein the second portion of the float component includes a counterweight that is more dense than the first portion of the float component.

22. The system of claim 21, wherein the counterweight obstructs the flow passage with the float component in the closed position.

23. The system of claim 21, wherein part of the second portion of the float component between the counterweight and the flow passage obstructs the flow passage with the float component in the closed position.

24. The system of claim 21, wherein the counterweight is adjustably mounted to the float portion to allow tuning of behavior of the float component.

25. The system of claim 14, wherein the outlet port and a bypass port are coupled to a vortex valve of an inflow control device.

26. The system of claim 25, wherein the inflow control device is positioned in a well tool usable in a wellbore.

27. The system of claim 14, wherein the float component is movable from the open position to the closed position in response to the first fluid component from the inlet port being predominantly water, and wherein the float component is movable from the closed position to the open position in response to the second fluid component from the inlet port being predominantly a hydrocarbon.

28. A method comprising:
receiving, by a fluid flow control device, fluid through an inlet port of the fluid flow control device;
rotating, by the fluid flow control device, a rotatable component about a central axis in response to a portion of the fluid flowing from the inlet port;
hinging a float component positioned within the rotatable component to a closed position based on a first fluid component from the inlet port having a first density and based on a first force being applied to the float component as the rotatable component rotates about the central axis;
preventing, by the float component in the closed position, the first fluid component from flowing from the inlet port to an outlet port of the fluid flow control device;
hinging the float component to an open position based on a second fluid component from the inlet port having a second density and based on a second force being applied to the float component as the rotatable component rotates about the central axis; and
enabling, by the float component in the open position, the second fluid component to flow from the inlet port to the outlet port.

* * * * *